US008824794B1

(12) United States Patent
Nash (10) Patent No.: US 8,824,794 B1
(45) Date of Patent: Sep. 2, 2014

(54) GRADUATED COLOR CORRECTION OF DIGITAL TERRAIN ASSETS ACROSS DIFFERENT LEVELS OF DETAIL

(71) Applicant: Google Inc., Mountain View, CA (US)

(72) Inventor: Reuel William Nash, Austin, TX (US)

(73) Assignee: Google Inc., Mountain View, CA (US)

( * ) Notice: Subject to any disclaimer, the term of this patent is extended or adjusted under 35 U.S.C. 154(b) by 74 days.

(21) Appl. No.: 13/747,873

(22) Filed: Jan. 23, 2013

Related U.S. Application Data (60) Provisional application No. 61/589,825, filed on Jan. 23, 2012.

(51) Int. Cl.
*G06K 9/00* (2006.01)
*G06T 5/00* (2006.01)

(52) U.S. Cl.
CPC ...................................... *G06T 5/001* (2013.01)
USPC .......................................... 382/167; 382/254

(58) Field of Classification Search
None
See application file for complete search history.

(56) References Cited

U.S. PATENT DOCUMENTS

| 6,075,905 | A * | 6/2000 | Herman et al. ............... 382/284 |
| 8,189,031 | B2 * | 5/2012 | Kim et al. ....................... 348/36 |
| 8,340,423 | B1 | 12/2012 | Zelinka et al. |
| 2007/0025595 | A1 * | 2/2007 | Koizumi et al. .............. 382/103 |
| 2007/0206854 | A1 * | 9/2007 | Stahlke .......................... 382/168 |
| 2012/0141014 | A1 * | 6/2012 | Lepikhin et al. .............. 382/154 |

OTHER PUBLICATIONS

Xu, Wei, and Jane Mulligan. "Performance evaluation of color correction approaches for automatic multi-view image and video stitching." Computer Vision and Pattern Recognition (CVPR), 2010 IEEE Conference on. IEEE, 2010.*
Agarwala, Aseem, et al. "Interactive digital photomontage." ACM Transactions on Graphics (TOG). vol. 23. No. 3. ACM, 2004.*

* cited by examiner

*Primary Examiner* — Li Liu
(74) *Attorney, Agent, or Firm* — Dority & Manning, P.A.

(57) ABSTRACT

The embodiments described below include systems, methods, and computer storage mediums for blending image assets based on changes in a zoom level. An exemplary method includes determining an image asset from a collection of image assets, wherein the image asset is determined as a function of the zoom level. When the zoom level meets a threshold zoom level, a color corrected image asset is determined from the collection of image assets. The color corrected image asset is determined as a function of the zoom level and a color correction profile. The image asset and the color corrected image asset are blended, where the blending includes applying a first coefficient value to the image asset and a second coefficient to the color corrected image asset. Each of the first and second coefficient values may be determined as a function of the difference between the zoom level and the threshold zoom level.

20 Claims, 6 Drawing Sheets

GRADUATED COLOR CORRECTION OF DIGITAL TERRAIN ASSETS ACROSS DIFFERENT LEVELS OF DETAIL

This application claims the benefit of U.S. Provisional Application No. 61/589,825 filed Jan. 23, 2012, which is incorporated herein in its entirety by reference.

FIELD

The embodiments described herein generally relate to geographic information systems.

BACKGROUND

In a GIS, mosaics of images that form the overall imagery fix a planetary body such as, for example, the Earth, look "patchy" due to the variation in season, time-of-day, and color parameters used in processing across image assets. The "patchy" effect is a quality of GIS data that users find undesirable. Some GIS systems overcome the "patchy" effect by using a globe made from "pretty" image assets, where the colors have been carefully matched. Examples of "pretty" image assets include the Blue Marble products, available from the National Air and Space Administration, and SPOT satellite imagery products, available from Astrium Services of Toulouse, France. These "pretty" image assets, however, generally do not have high enough resolution so users can see necessary levels of detail when zoomed in at high levels.

BRIEF SUMMARY

The embodiments described below include systems, methods, and computer storage mediums for blending image assets based on changes in a zoom level. An example method includes determining an image asset from a collection of image assets, wherein the image asset is determined as a function of the zoom level. When the zoom level meets a threshold zoom level, a color corrected image asset is determined from the collection of image assets. The color corrected image asset is determined as a function of the zoom level and a color correction profile. The image asset and the color corrected image asset are blended, where the blending includes applying a first coefficient value to the image asset and a second coefficient to the color corrected image asset. Each of the first and second coefficient values may be determined as a function of the difference between the zoom level and the threshold zoom level.

Further features and advantages of the embodiments described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

In the following detailed description, references to "one embodiment," "an embodiment," "an example embodiment," etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

The detailed description is broken into sections. The first section describes an example threshold used to determine when image assets are blended as a zoom level changes. The second and third sections describe example method and system embodiments that may be used to blend image assets as a zoom level changes. The fourth section describes an example computer system that may be used to implement the embodiments described herein.

Example Zoom Threshold

Figure 1:
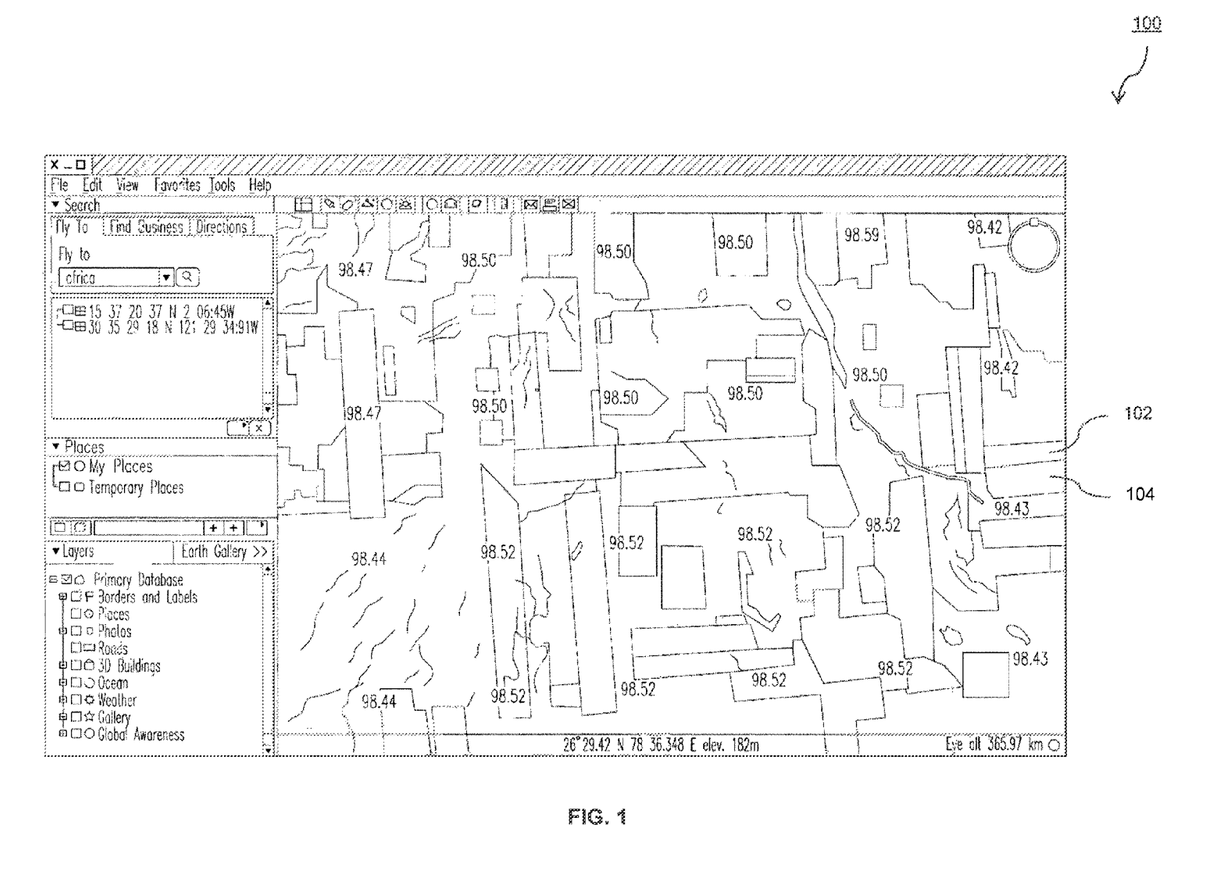
FIG. 1 is an example diagram illustrating patchiness in image assets.

FIG. 1 is an example diagram 100 illustrating patchiness in image assets. Diagram 100 is a screenshot of a geographical information system that displays a perspective of the Earth. The perspective may be comprised of multiple image assets such as, for example, image asset 102 and image asset 104. The image assets may be collected using different methods including, but not limited to, satellite and aerial photography.

Because the assets may be collected at different times (of day and year) and, perhaps, using different methods, adjacent image assets and may have different color balances. For example, some image asset 102 may be collected at midday, and adjacent image asset 104 may be collected later in the day. Because of the difference in time, image assets may differ in brightness, hue, or other characteristics. As result, the image mosaic may appear patchy, as illustrated in diagram 100. Such abrupt color balance changes may be visually jarring and highly noticeable. To help account for these color variations, the embodiments described below may smooth the appearance of color changes while zooming. In this way, the embodiments may improve the user experience of the geographic information system.

At course levels of detail, coherent maps of the entire Earth may be available. These may be referred to as "pretty" image assets. For example, at low resolution, imagery may be available that has been corrected for color Variations over wide areas. Higher resolution images, however, may not be available with coherent coloring that spans large areas. Embodiments gradually shift between globally consistent colors available at the course levels and locally consistent colors at the fine levels as the level of detail increases. How color correction is shifted as the level of detail changes is described in more detail with respect to FIG. 2B.

Figure 2A:
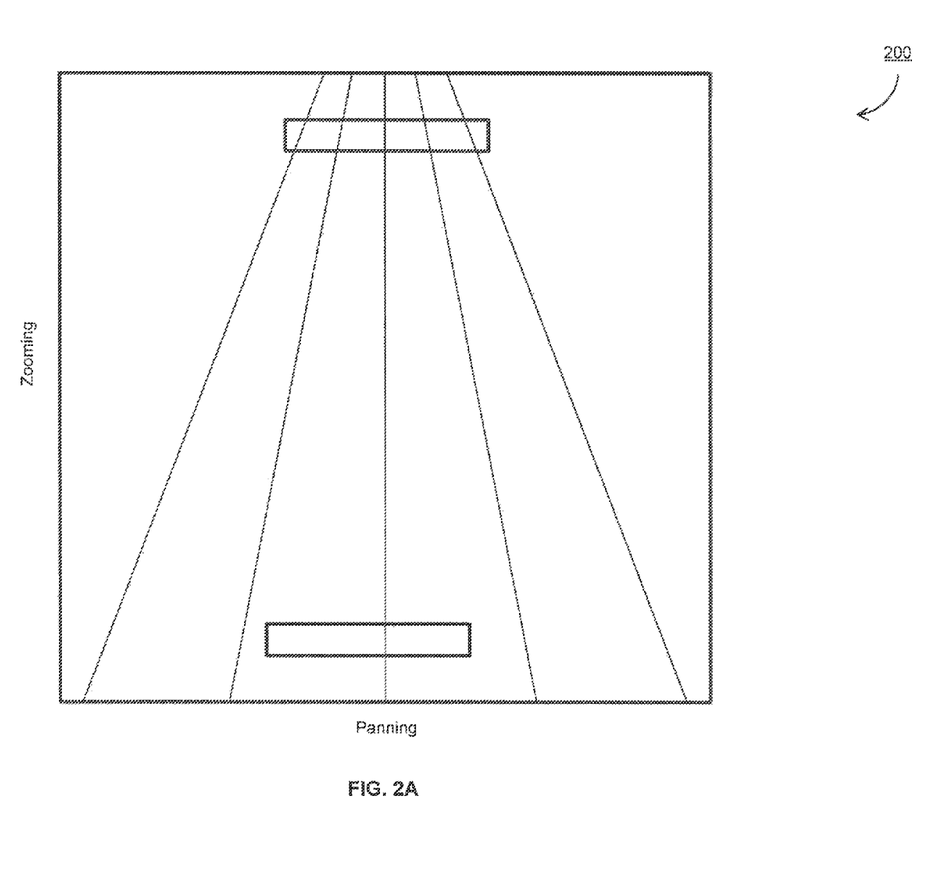
FIG. 2A is a diagram illustrating an example used in the prior art where image assets are not blended as a zoom level changes.

FIG. 2A is a diagram illustrating an example used in the prior art where image assets are not blended as a zoom level changes. For example, if a user changes the zoom level in diagram. 100, the patchiness between image assets are not blended. Thus, as the user zooms out to less detail, patchiness will be apparent across multiple image assets. As the user zooms into greater detail, though, a single image asset may fill the user's display and patchiness between image assets will not be noticeable unless the user pans between image assets.

Figure 2B:
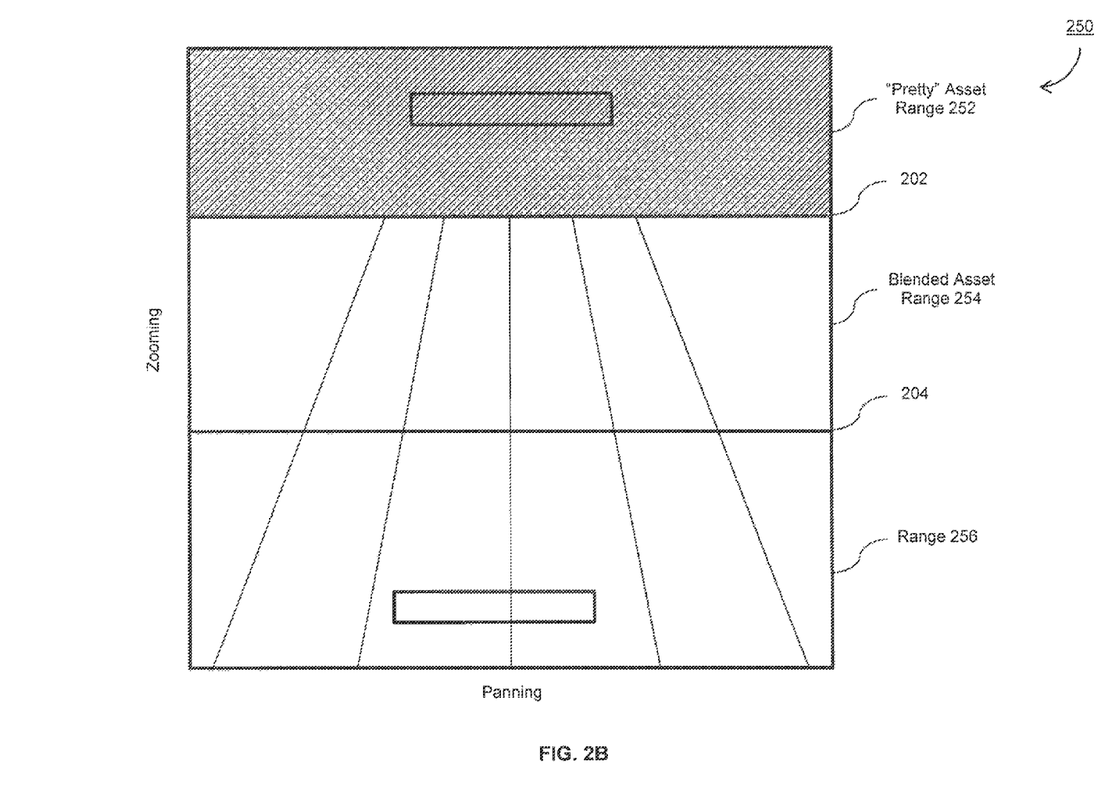
FIG. 2B is a diagram illustrating an example threshold used to determine when image assets are blended as a zoom level changes.

FIG. 2B shows a diagram 250 illustrating an example thresholds used to determine when image assets are blended as a zoom-level changes. Specifically, diagram 250 illustrates now correction of color variations may change depending on the zoom level of the image. Diagram 250 divides the levels of detail into three ranges. The coarsest levels of detail, which have a value less than or equal to a threshold 202, fall into a "pretty" range 252; the intermediate levels of detail, which have a value greater than threshold 202 and less than or equal to a threshold 204, fall into a blended range 254; and the finest levels of detail, which have a value greater than a threshold 204, fall into a range 256. Images within each of the ranges 252, 254, and 256 are color corrected using a somewhat different technique.

Images with levels of detail within the coarsest range 252 are corrected using data available from the course coherent maps, e.g., the "pretty" maps. This color correction technique may be referred to as region color correction and is described in U.S. Pat. No. 8,340,423, issued Dec. 25, 2012, incorporated by reference herein in its entirety.

Other techniques are used on images with levels of detail within the finest range 252. At these levels, the images may not even be corrected for color variations. In other examples, the color correction techniques at the finer level of details may rely more heavily on the local surrounding images. Finally, the color correction technique may also use a region color correction technique, but with different parameters.

At intermediate levels of detail with range 254, two images may be generated at each tile. The first image may be generated according to the color correction technique used for images within range 252, and the second image may be generated according to the color correction technique used for images within range 256. The two images may be blended to generate the final color corrected image for each tile. In an embodiment, the two images may be blended using alpha blending (e.g., a linear combination in RGB space.) In conducting the blending, different weights or coefficients may be applied to the different images. Specifically, the weight applied to the first image made using color correction technique for images at the courser range 252 may be stronger at the courser levels of detail within range 254 and may be weaker at the finer levels of detail within range 254. As a corollary, the weight applied to the second image made using color correction technique for images at the finer range 256 may be weaker at the courser levels of detail within range 254 and may be the stronger at finer levels of detail within range 254. By gradually transitioning between the two color correction techniques, embodiments may smooth the appearance of color changes while zooming.

Specific examples of how the images may be blended are described below with respect to method and system embodiments.

Example Method Embodiments

Figure 3:
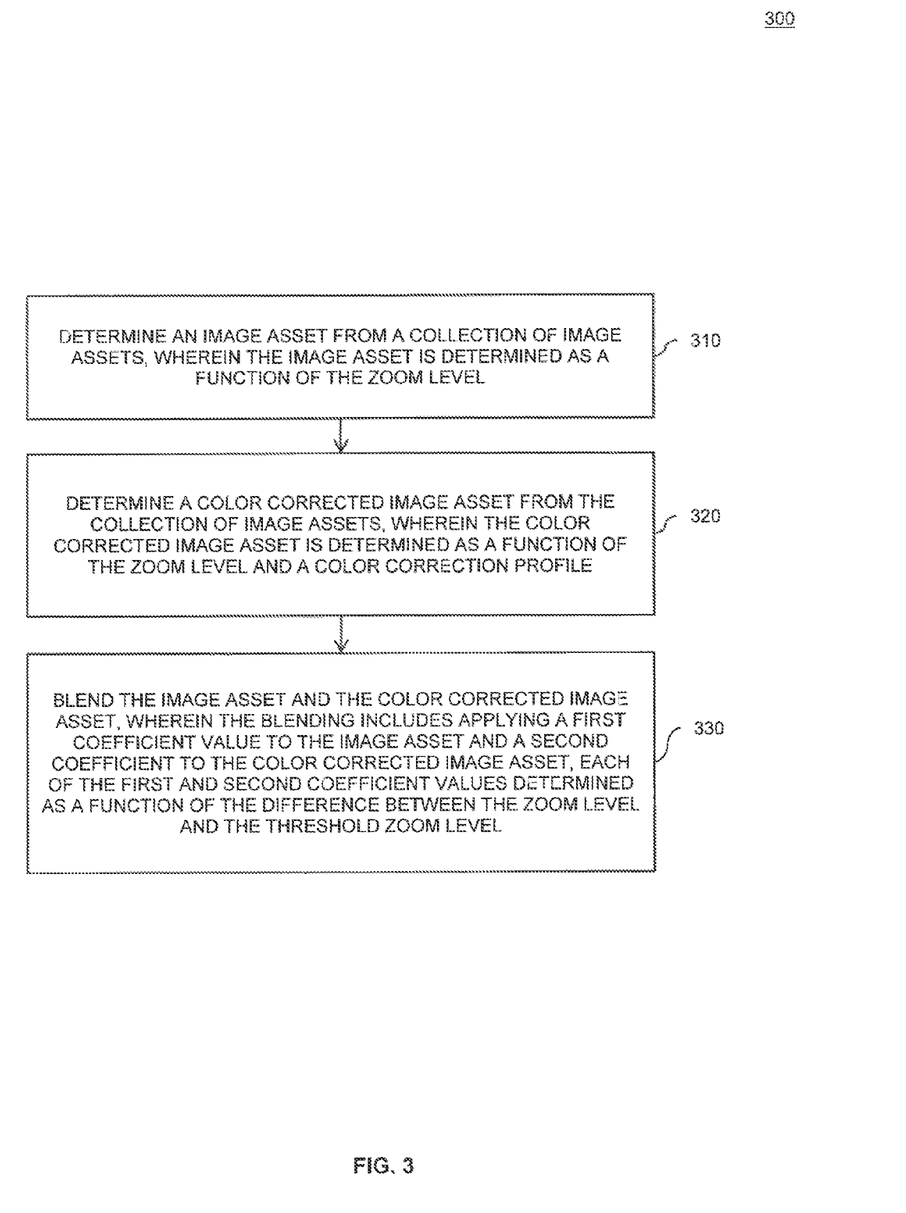
FIG. 3 is a flowchart illustrating an example method for blending image assets as a zoom level changes, according to some embodiments.

FIG. 3 is a flowchart illustrating an example method for blending image assets as a zoom level changes, according to some embodiments. While method 300 is described with respect to one embodiment, method 300 is not meant to be limiting and may be used in other applications. Additionally, method 300 may be carried out by system 400, for example.

Method 300 determines an image asset from a collection of image assets (stage 310). The image asset is determined as a function of the zoom level. In some embodiments, the collection of image assets may be configured such that each image asset in the collection is pre-determined based on a number of corresponding zoom levels. In some embodiments, the collection of image assets may include image data that is used to determine an image asset for a particular zoom level. For example, if a user is viewing the collection of image assets at the lowest zoom level, the image asset that is displayed to the user may be determined by generating the lowest resolution image asset. As the zoom level increases, the image asset may be adjusted such that the level of resolution increases.

Figure 4:
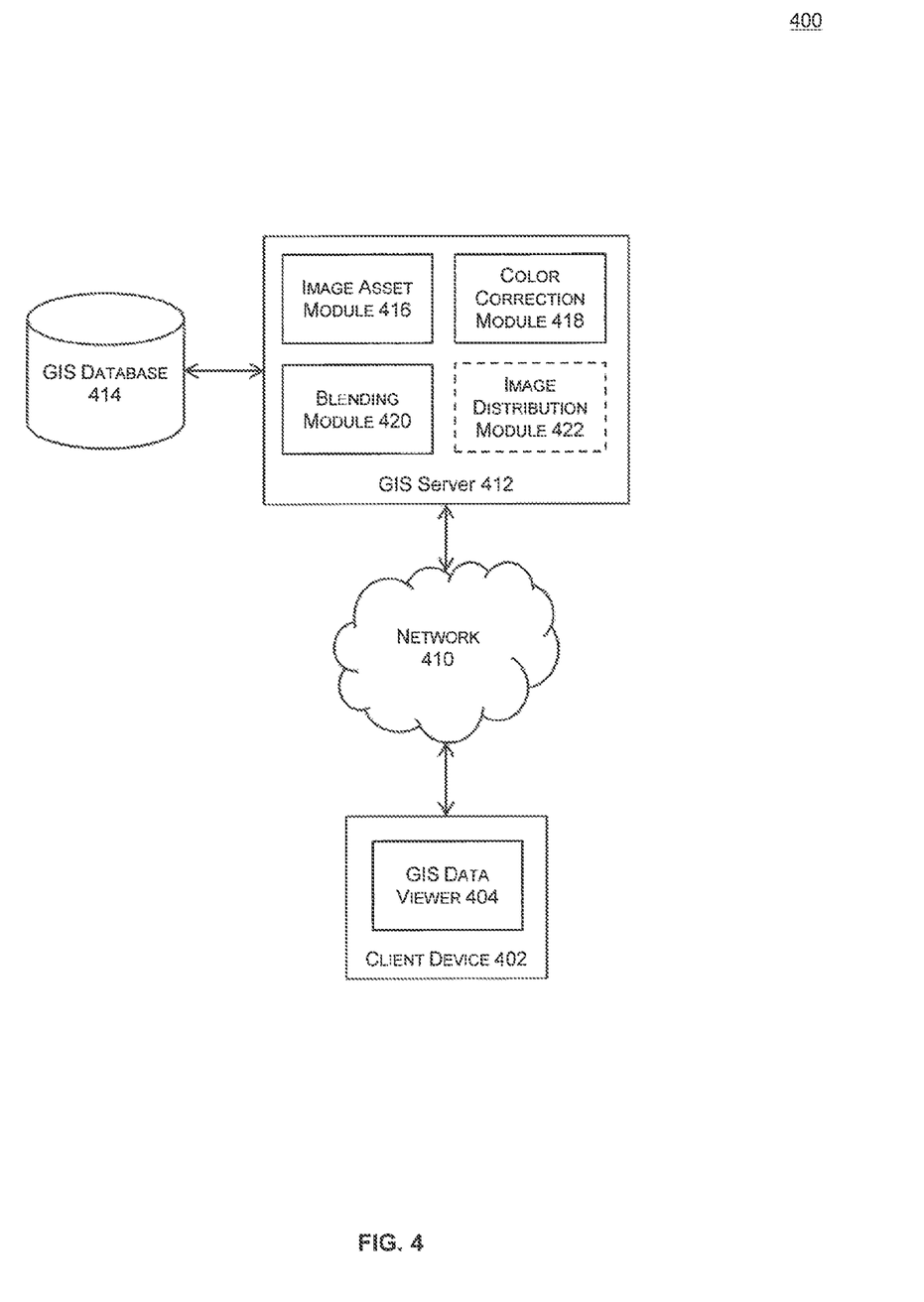
FIG. 4 is an example system environment that may be used for blending image assets as a zoom level changes, according to some embodiments.

In some embodiments, the image asset determined from the collection of image assets may be processed based on adjacent image assets in the same collection or image assets from other collections determined from the same zoom level. The image asset may also be processed based on any number of color profiles that can be used to indicate, for example, a season, a region, a boundary, or a feature. Step 310 may be carried out by, for example, image asset module 416 embodied in system 400.

When the zoom level meets a threshold zoom level, method 300 determines a color corrected image asset from the collection of image assets (stage 320). The color corrected image asset is determined as a function of the zoom level and a color correction profile. In some embodiments, the color correction profile corresponds to a color profile associated with a set of "pretty" image assets that are used while the zoom level is below the threshold zoom level. For example, a set of "pretty" image assets may be provided for display at zoom levels below the zoom level threshold. When the zoom level reaches the zoom level threshold, the "pretty" image assets may not provide a sufficient level of detail, therefore, an image asset may be determined from the collection of image assets. To maintain a similar color scheme, the image asset may be color corrected by applying a color profile associated with, or corresponding to the "pretty" image assets. The color profile may be pre-determined or may be determined by analyzing the "pretty" image assets.

One method of applying color correction to the image asset is provided in U.S. Pat. No. 8,340,423, issued Dec. 25, 2012, incorporated herein in its entirety by reference. Step 320 may be carried out by, for example, color correction module 418 embodied in system 400.

Once the image asset and the color corrected image asset are determined, method 400 blends the image asset and the color corrected image asset (stage 330). In some embodiments, blending the image asset and the color corrected image asset includes applying a first coefficient value to the image asset and a second coefficient to the color corrected image asset. Each of the first and second coefficient values may be determined as a function of the difference between the zoom level and the threshold zoom level. For example, when the zoom level matches the zoom level threshold, the second coefficient may indicate a 100% value while the first coefficient indicates a 0% value. In this case, the resulting blended image asset at this zoom level will match the color corrected image asset. Similarly, as the zoom level increases, the first coefficient may increase proportionally as the second coefficient decreases. Thus, when the zoom level is high enough, the first coefficient value may be 100% while the second coefficient value is 0%.

In some embodiments, "pretty" image assets are utilized for zoom levels 140. For zoom level 11, a color corrected image asset is determined from the collection of image assets using the color profile associated with the "pretty" image assets. For zoom levels 12-15, a blended image asset is determined by blending the image asset with the color corrected image asset where the first and second coefficients correspond to the following table:

| Zoom Level | First Coefficient | Second Coefficient |
|---|---|---|
| Level 12 | 20% | 80% |
| Level 13 | 40% | 60% |
| Level 14 | 60% | 40% |
| Level 15 | 80% | 20% |

For zoom level 16 and above, an image asset is determined from the collection of image assets. This embodiment is merely provided as an example and is not intended to limit the embodiments described herein in any way. Consequently, the transitions between the various image assets and the values of the coefficients may occur at different zoom levels. Additionally, a greater or lesser number of zoom levels may utilize blending of the image asset with the color corrected image asset. Step 330 may be carried out by, for example, blending module 420 embodied in system 400.

Example System Embodiments

FIG. 4 is an example system environment that may be used for blending image assets as a zoom level changes, according to some embodiments. System 400 includes client device 402. Client device 402 can include any computing device capable of communicating with a GIS including, for example, stationary computing devices (e.g., desktop computers) and mobile computing devices such as, for example, tablets, smartphones, or other network enabled portable digital devices. Mobile computing devices may utilize Global Positioning System ("GPS") data, touch-screen interfaces, and location services to assist with retrieving and displaying geo-referenced data. In some embodiments, client device 402 may include GIS data viewer 404 for viewing data received from GIS server 412. GIS data viewer 404 may be implemented in software or as a webpage viewable by a browser.

System 400 also includes network 410. Network 410 can include any network or combination of networks that can carry data communication. These networks can include, for example, a local area network (LAN) or a wide area network (WAN), such as the Internet. LAN and WAN networks can include any combination of wired (e.g., Ethernet) or wireless (e.g., Wi-Fi or 3G) network components.

System 400 also includes GIS server 412 and GIS database 414. GIS server 412 includes image asset module 416, color correction module 418, blending module 420, and image distribution module 422. These modules are not intended to limit the embodiments described herein. Consequently, one of skill in the art will readily understand how the functionality described herein may be implemented by using one or more alternative modules or configurations. GIS server 412 can include any GIS capable of capturing, storing, manipulating, analyzing, managing, and presenting geographically referenced ("geo-referenced") data. Further, GIS database 414 can include any database implemented in software or hardware capable of storing and retrieving geographically referenced data.

Image asset module 416 is configured to carry out the functionality of stage 310 of method 300 described above. Thus, the functionality of image asset module 416 is additionally described above with reference to stage 310. As image asset module 416, as shown in FIG. 4, is connected to GIS database 414 via GIS server 412, image assets may be accessed from GIS database 414. Alternatively, image assets may also be accessed from a source local to GIS server 412 or a source connected to GIS server 412 via network 410.

Color correction module 418 is configured to carry out the functionality of stage 320 of method 300 described above. Thus, the functionality of color correction module 418 is additionally described above with reference to stage 320. In some embodiments, determining the color corrected image asset includes retrieving the color corrected image asset from a database such as, for example, GIS database 414 or another database or storage device accessible via network 410. In some embodiments, color correction module 418 determines a color corrected image asset by retrieving a color profile associated with a previously used "pretty" image asset and applying the color profile to the image asset determined in stage 310 to create a new color corrected image asset. The color profile be retrieved from, for example, GIS database 418 or another data source via network 410.

Blending module 420 is configured to carry out the functionality of stage 330 of method 300 described above. Thus, the functionality of blending module 420 is additionally described above with reference to stage 330. In some embodiments, once blending module 420 completes blending image assets, any blended image assets may be stored at, for example, GIS database 414 or another local or remote database. These blended image assets may then be provided to users as the need arises or cached to speed up future use.

In some embodiments, image distribution module 422 is also included. Image distribution module 422 may be configured to provide image assets, color corrected image assets, blended image assets, or any combination thereof for display. Image distribution module 422 may also be configured to store one or more of image assets, color corrected image assets, or blended image assets at GIS database 414 for later display.

Image asset module 416, color correction module 418, blending module 420, and image distribution module 422, while shown running on GIS server 412, can run on any computing device. Each component or module may run on a distribution of computer devices or a single computer device. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet or mobile computing device), rack server, set-top box, or other type of computer system having at least one processor and memory. A computing process performed by a clustered computing environment or server farm may be carried out across multiple processors located at the same or different locations. Hardware can include, but is not limited, to, a processor, memory, and user interface display.

Various aspects of embodiments described herein can be implemented by software, firmware, hardware, or a combination thereof. The embodiments, or portions thereof, can also be implemented as computer-readable code. For example, image asset module 416, color correction module 418, blending module 420, and image distribution module 422 may be implemented in one or more computer systems or other processing systems. The embodiment in system 400 is not intended to be limiting in any way.

Alternative Embodiments

Many variations in the parameters are possible and have been considered, for example, choosing different levels and different fading coefficients. Examples of these levels and coefficients include pretty assets to level 12, 100% correction at level 13, 50% at level 14, and 0% at level 15.

Also, using no color correction with the second image used in blending (the one that receives the second coefficient above) may work well in areas where the color of the high resolution assets match the pretty assets already, especially when the tri-linear mip-mapping on the client effectively blends between two levels.

Finally, the Client could do the blending, when supplied the requisite data,

Example Computer System

Figure 5:
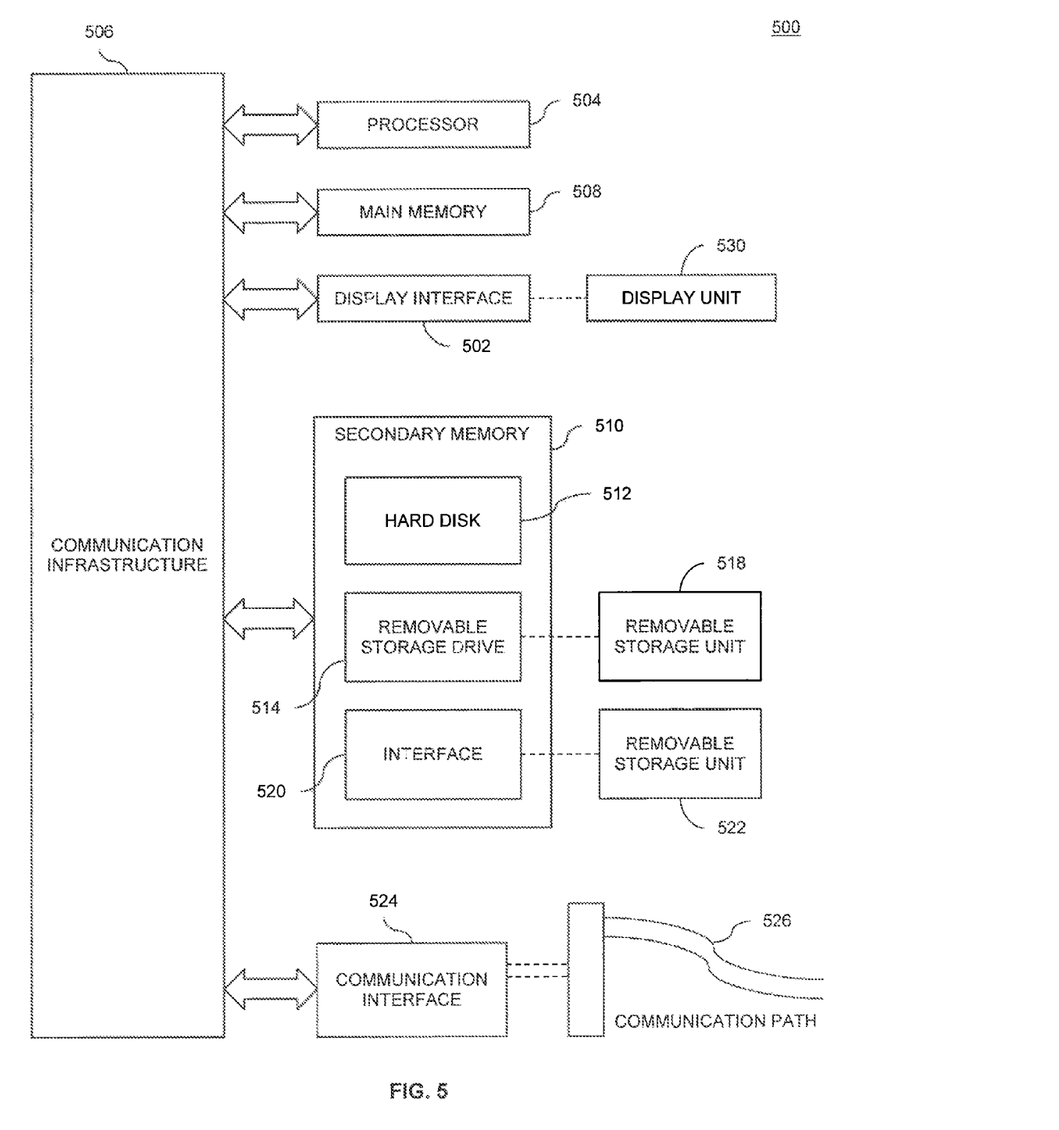
FIG. 5 illustrates an example computer in which embodiments of the present disclosure, or portions thereof, may be implemented as computer-readable code.

FIG. 5 illustrates an example computer system 500 in which embodiments of the present disclosure, or portions thereof, may be implemented. For example, the stages of method 300, may be implemented in one or more computer systems 500 using hardware, software, firmware, computer readable storage media having instructions stored thereon, or a combination thereof.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor deuce may be a single processor, a plurality of processors, or combinations thereof. Processor devices may have one or more processor "cores."

Various embodiments are described in terms of this example computer system 500. After reading this description, it will become apparent to a person skilled in the relevant art how to implement the invention using other computer systems and or computer architectures. Although operations may be described as a sequential process, some of the operations may in fact be performed in parallel, concurrently, and/or in a distributed environment, and with program code stored locally or remotely for access by single or multi-processor machines. To addition, in some embodiments the order of operations may be rearranged without departing from the spirit of the disclosed subject matter.

As will be appreciated by persona skilled in the relevant art, processor device 504 may be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may include a floppy disk drive, a magnetic tape drive, an optical disk drive, a flash memory, or the like. The removable storage drive 514 reads from and/or writes to a removable storage unit 518 in a well-known manner. Removable storage unit 518 may include a floppy disk, magnetic tape, optical disk, flash drive, etc. which is read by and written to by removable storage drive 514. As will be appreciated by persons skilled in the relevant art, removable storage unit 518 includes a computer readable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RE link or other communications channels.

In this document, the terms "computer storage medium" and "computer readable storage medium" are used to generally refer to media such as removable storage unit 518, removable storage unit 522, and a hard disk installed in hard disk drive 512. Computer storage medium and computer readable storage medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the embodiments described herein. In particular, the computer programs, when executed, enable processor device 504 to implement the processes of the embodiments, such as the stages in the methods illustrated by flowchart 300 of FIG. 3, discussed above. Accordingly, such computer programs represent controllers of computer system 500. Where an embodiment is implemented using software, the software may be stored in a computer storage medium and loaded into computer system 500 using removable storage drive 514, interface 520, and hard disk drive 512, or communications interface 524.

Embodiments of the invention also may be directed to computer program products including software stored on any computer readable storage medium. Such software, when executed in one or more data processing device, causes a data processing device(s) to operate as described herein. Embodiments of the invention employ any computer useable or readable storage medium. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or snore but not all exemplary embodiments as contemplated by the inventor(s), and thus, are not intended to limit the present invention and the appended claims in any way.

The foregoing description of specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for blending image assets based on changes in a zoom level, the method comprising:
   determining, by at least one computer processor, an image asset from a collection of image assets, wherein the image asset is determined as a function of the zoom level;
   when the zoom level meets a threshold zoom level:
      determining, by at least one computer processor, a color corrected image asset from the collection of image assets, wherein the color corrected image asset is determined as a function of the zoom level and a color correction profile; and
      blending, by at least one computer processor, the image asset and the color corrected image asset, wherein the blending includes applying a first coefficient value to the image asset and a second coefficient to the color corrected image asset, each of the first and second coefficient values determined as a function of the difference between the zoom level and the threshold zoom level.

2. The method of claim 1, wherein blending the image asset and the color corrected image asset includes reducing the second coefficient as the zoom level increases.

3. The method of claim 1, wherein blending the image asset and the color corrected image asset includes increasing the first coefficient as the zoom level increases.

4. The method of claim 1, wherein blending the image asset and the color corrected image asset includes alpha blending the image asset and the color corrected image asset, the degree of alpha blending being a function of the difference between the zoom level and the threshold zoom level.

5. The method of claim 4, wherein the first coefficient indicates 0 percent and the second coefficient indicates 100 percent when the difference between the zoom level and the threshold zoom level is zero.

6. The method of claim 5, wherein first coefficient indicates 100 percent and the second coefficient indicates 0 percent when the difference between the zoom level and the threshold zoom level exceeds a blending threshold.

7. The method of claim 1, wherein the color correction profile includes a region-corrected color profile based on a statistical analysis of color in image assets that correspond to adjacent zoom levels.

8. The method of claim 1, carried out at a client device configured to render the blended image asset.

9. The method of claim 1, carried out at a server device configured to provide requested image asset to a client device configured to render the blended image asset.

10. The method of claim 1, further comprising:
   providing image assets, color corrected image assets, and blended image assets to a client computing device for display.

11. A computer system for transitioning between image assets based on changes in a zoom level, comprising:
   an image asset module configured to determine an image asset from a collection of image assets, wherein the requested image asset corresponds to the zoom level;
   a color correction module configured to, when the zoom level meets a threshold zoom level, determine a color corrected image asset from the image asset, wherein the color corrected image asset is determined as a function of the image asset and a color correction profile; and
   a blending module configured to, when the zoom level meets a threshold zoom level, blend the image asset and the color corrected image asset, wherein the blending includes applying a first coefficient value to the image asset and a second coefficient to the color corrected image asset, each of the first and second coefficient values determined as a function of the difference between the zoom level and the threshold zoom level;
   at least one computer processor configured to execute at least one of the image asset module, the color correction module, or the blending module; and
   at least one memory unit configured to store at least one of the image asset module, the color correction module, or the blending module.

12. The system of claim 11, wherein the blending module is further configured to reduce the second coefficient as the zoom level increases.

13. The system of claim 11, wherein the blending module is further configured to increase the first coefficient as the zoom level increases.

14. The system of claim 11, wherein the blending module is further configured to blend alpha blend the image asset and the color corrected image asset, wherein the degree of alpha blending being a function of the difference between the zoom level and the threshold zoom level.

15. The system of claim 14, wherein the first coefficient indicates 0 percent and the second coefficient indicates 100 percent when the difference between the zoom level and the threshold zoom level is zero.

16. The system of claim 15, wherein first coefficient indicates 100 percent and the second coefficient indicates 0 percent when the difference between the zoom level and the threshold zoom level exceeds a blending threshold.

17. The system of claim 11, wherein the color correction profile includes a region-corrected color profile based on a statistical analysis of color in image assets that correspond to adjacent zoom levels.

18. The method of claim 11, wherein the computer system is a client device that is further configured to render the blended image asset on the client device's display unit.

19. The method of claim 11, wherein the computer system is a server device configured to provide blended image asset to a client device configured to render the blended image asset.

20. The method of claim 11, further comprising:
    an image distribution module configured to provide image assets, color corrected image assets, and blended image assets to a client computing device for display.

\* \* \* \* \*